US012243704B2

(12) United States Patent
Cloran et al.

(10) Patent No.: US 12,243,704 B2
(45) Date of Patent: Mar. 4, 2025

(54) ROTARY LOCKOUT TAGOUT LATCH SYSTEM

(71) Applicant: Rockwell Automation Technologies, Inc., Mayfield Heights, OH (US)

(72) Inventors: Shawn Cloran, Wauwatosa, WI (US); Darrell Filtz, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 435 days.

(21) Appl. No.: 17/681,253

(22) Filed: Feb. 25, 2022

(65) Prior Publication Data

US 2023/0274895 A1 Aug. 31, 2023

(51) Int. Cl.
*H01H 9/20* (2006.01)
*H01H 9/16* (2006.01)
(Continued)

(52) U.S. Cl.
CPC ............ *H01H 9/223* (2013.01); *H01H 9/161* (2013.01); *H01H 9/18* (2013.01); *H01H 9/282* (2013.01);
(Continued)

(58) Field of Classification Search
CPC .......... H01H 9/20; H01H 9/223; H01H 9/161; H01H 9/18; H01H 9/282; H01H 71/56; H01H 2071/565; H01H 2219/036; H01H 2219/0621; H01H 19/14; H01H 19/11; H01H 19/585; H01H 19/58; H01H 19/62; H01H 19/635; H01H 19/64; H01H 19/63; H01H 19/005; H01H 19/10; H01H 1/2041;
(Continued)

(56) References Cited

U.S. PATENT DOCUMENTS 3,848,102 A 11/1974 Jencks et al.
3,980,845 A 9/1976 Gryctko et al.
(Continued)

FOREIGN PATENT DOCUMENTS

CN 101276711 B 10/2008
DE 19939717 A1 2/2001
(Continued)

OTHER PUBLICATIONS

Extended European Search Report, Application No. 23158208.1, dated Aug. 28, 2023 (9 Pages).

*Primary Examiner* — Ahmed M Saeed

(57) ABSTRACT

A latch system for an electrical equipment enclosure includes a chassis and a latch arm, engaged with a circuit breaker, that moves between first, second, and intermediate arm positions. A handle operatively connected to the circuit breaker is movable between ON, TRIP, OFF, and RESET handle positions. The handle is operatively connected to the latch arm such that the latch arm is positioned in the second arm position when the handle is located in said RESET handle position. The latch arm spring biases the latch arm into the first or intermediate positions when the handle is in the ON, TRIP, or OFF handle position. A lockout plunger is connected to the handle to rotate with the handle and is movable between disengaged and engaged positions. The lockout plunger prevents movement of the handle from the OFF to the ON handle position when the lockout plunger is in its engaged position.

20 Claims, 15 Drawing Sheets

(51) Int. Cl.

| | |
|---|---|
| ***H01H 9/18*** | (2006.01) |
| ***H01H 9/22*** | (2006.01) |
| ***H01H 9/28*** | (2006.01) |
| ***H01H 71/56*** | (2006.01) |

(52) U.S. Cl.
CPC ....... *H01H 71/56* (2013.01); *H01H 2071/565* (2013.01); *H01H 2219/036* (2013.01); *H01H 2219/0621* (2013.01)

(58) Field of Classification Search
CPC ........ H01H 19/56; H01H 19/03; H01H 19/02; H01H 2019/006; H01H 19/00; H01H 21/50; H01H 2221/01
See application file for complete search history.

(56) References Cited

U.S. PATENT DOCUMENTS

| | | | |
|---|---|---|---|
| 4,308,437 A | 12/1981 | Takagi et al. | |
| 5,219,070 A | 6/1993 | Grunert et al. | |
| 5,288,958 A | 2/1994 | Grunert et al. | |
| 6,423,912 B1 | 7/2002 | Arenz et al. | |
| 6,566,618 B2 | 5/2003 | Hamada et al. | |
| 7,238,903 B2 | 7/2007 | Fischer | |
| 7,368,675 B2 | 5/2008 | Ishido et al. | |
| 7,399,934 B2 | 7/2008 | Emura et al. | |
| 7,420,133 B2 | 9/2008 | Farrow et al. | |
| 7,560,654 B2 | 7/2009 | Blankemeyer et al. | |
| 8,115,127 B2 | 2/2012 | Nguyen et al. | |
| 9,496,101 B2 | 11/2016 | Oneufer et al. | |
| 9,685,282 B2 | 6/2017 | Mun et al. | |
| 10,319,541 B1 * | 6/2019 | Clark ....................... | H01H 3/10 |
| 2008/0073188 A1 | 3/2008 | Emura et al. | |
| 2015/0221459 A1 | 8/2015 | Oneufer et al. | |
| 2016/0035526 A1 * | 2/2016 | Mittlestadt ......... | H01H 71/0264 200/50.02 |
| 2018/0240635 A1 * | 8/2018 | Warne .................. | H01H 71/128 |

FOREIGN PATENT DOCUMENTS

| | | |
|---|---|---|
| EP | 2595166 A2 | 5/2013 |
| FR | 2906399 A1 | 3/2008 |
| JP | 4872756 B2 | 2/2012 |
| JP | 5741381 B2 | 7/2015 |

* cited by examiner

ROTARY LOCKOUT TAGOUT LATCH SYSTEM

BACKGROUND INFORMATION

During maintenance of industrial equipment, it is often necessary for service personnel to work on machinery which could pose a hazard if not fully deenergized, or if accidentally reenergized, during the maintenance operation. For this reason, it is known to use lockout-tagout (LOTO) procedures to ensure disconnection of operative electrical power to such equipment for maintenance and to prevent accidental premature reconnection of electrical power to the equipment. In particular, it is known to equip the access door of cabinets/enclosures that house equipment with a rotating or pivoting latch that both latches and unlatches the door and also controls a circuit breaker or electrical contactor to prevent service personnel from unknowingly opening the access door while the equipment is energized and to prevent the equipment from being inadvertently energized when the door is open.

BRIEF DESCRIPTION

In accordance with one aspect of the present development, a latch system for an electrical equipment enclosure includes a latch arm receiver adapted to be connected to an associated enclosure door. A latch arm assembly is adapted to be connected in operative engagement with an associated circuit breaker. The latch arm assembly includes a chassis and a latch arm that moves relative to the chassis between: (i) a first arm position; (ii) a second arm position; and (iii) an intermediate arm position between the first arm position and the second arm position. A latch arm spring biases the latch arm toward its first arm position. A handle is rotatably connected to the chassis and operatively connected to the toggle of the circuit breaker. The handle is movable to and between an ON handle position, a TRIP handle position, an OFF handle position, and a RESET handle position. The handle is operatively connected to the latch arm such that the latch arm is positioned in the second arm position when the handle is located in said RESET handle position. The latch arm spring biases the latch arm into one of the first position and the intermediate position when the handle is in any one of said ON handle position, said TRIP handle position, and said OFF handle position. A lockout plunger is connected to the handle to rotate with the handle and is movable between a disengaged position and an engaged position, wherein the lockout plunger prevents movement of the handle from the OFF handle position to the ON handle position when the lockout plunger is in its engaged position.

In accordance with another aspect of the present development, an enclosure includes a body including an internal space and an enclosure opening that provides access to the internal space. A door is movable between a closed position and an opened position, wherein the door covers the enclosure opening and blocks access to the internal space in the closed position, the door including a door opening defined therein. A latch system is connected to the body in the internal space and includes a latch arm receiver connected to door. A circuit breaker controls connection of electrical power to associated equipment located in the internal space of the body. The circuit breaker includes a toggle that moves between a first toggle position, a second toggle position, a third toggle position, and a fourth toggle position corresponding respectively to ON, TRIPPED, OFF, and RESET operative states of the circuit breaker. A latch arm assembly is connected to the circuit breaker in operative engagement with the circuit breaker toggle to move the toggle between said first, second, third, and fourth toggle positions. The latch arm assembly includes a chassis and a latch arm that moves relative to the chassis between: (i) a first arm position; (ii) a second arm position; and (iii) an intermediate arm position between the first arm position and the second arm position. A latch arm spring biases the latch arm toward its first arm position. A handle is rotatably connected to the chassis and operatively connected to the toggle of the circuit breaker. The handle is movable to and between an ON handle position, a TRIP handle position, an OFF handle position, and a RESET handle position. The handle is operatively connected to the latch arm such that the latch arm is positioned in the second arm position when the handle is located in said RESET handle position. The latch arm spring biases the latch arm into one of the first position and the intermediate position when the handle is in any one of said ON handle position, said TRIP handle position, and said OFF handle position. A lockout plunger is connected to the handle to rotate with the handle and is movable between a disengaged position and an engaged position, wherein the lockout plunger prevents movement of the handle from the OFF handle position to the ON handle position when the lockout plunger is in its engaged position.

DETAILED DESCRIPTION

Figure 1:
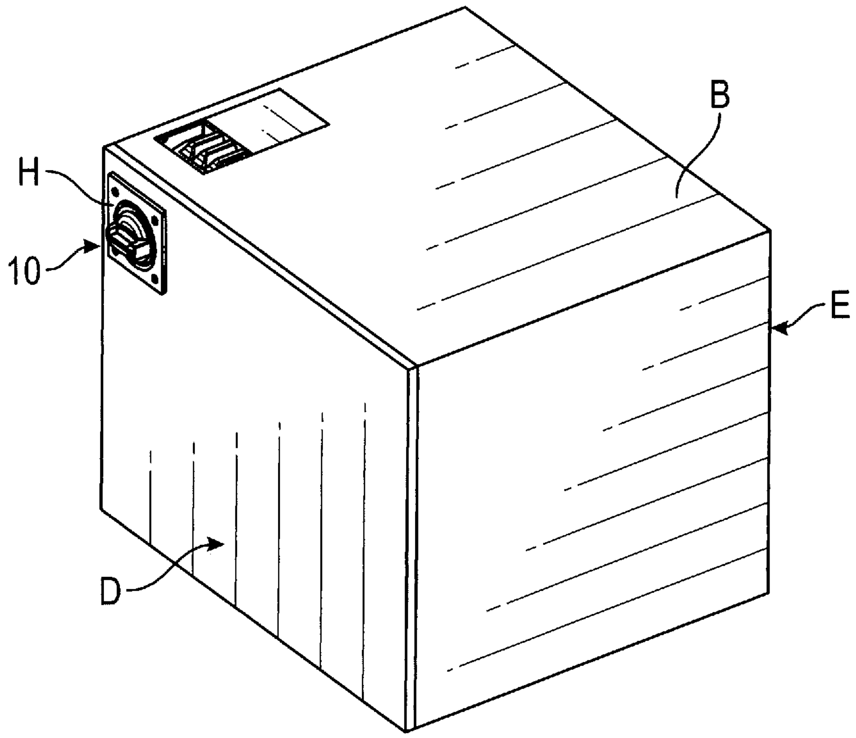
FIG. 1. is an isometric view of an electrical enclosure or electrical cabinet including a rotary lockout tagout latch system in accordance with an embodiment of the present disclosure, with a door of the cabinet in a closed position.
Figure 2:
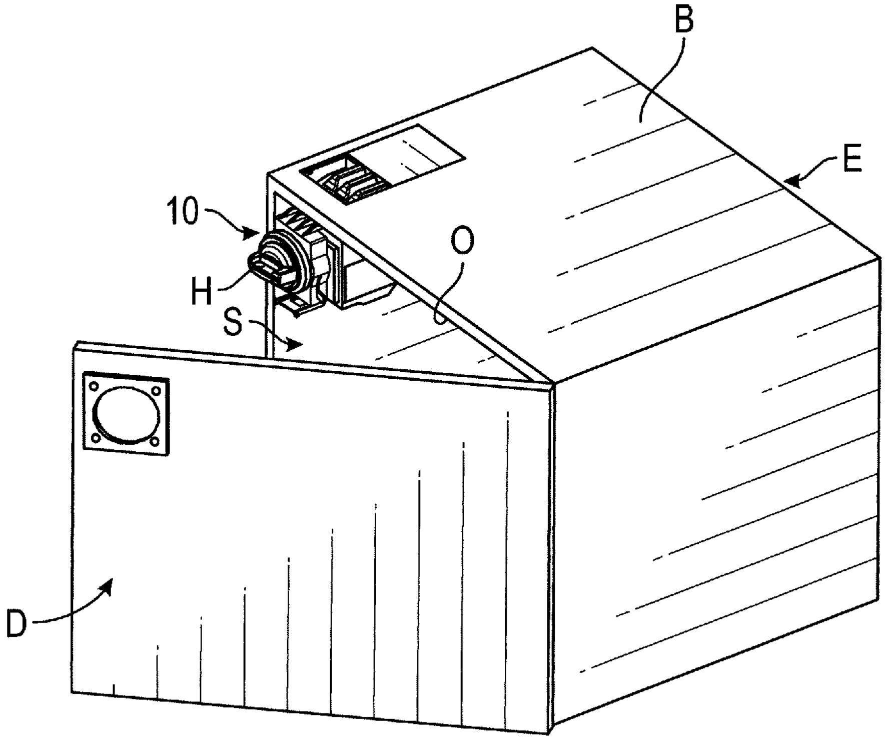
FIG. 2. is similar to FIG. 1 but shows the door in an opened position to allow access to electrical equipment located in an interior space of the cabinet.

FIGS. 1 & 2 provide front isometric views of electrical enclosure or electrical cabinet E including a rotary latch system 10 in accordance with an embodiment of the present disclosure. As shown in FIG. 2, the enclosure E includes a body B that defines an interior space S. At least one of the walls of the enclosure include an opening O that provides access to the interior space S. The enclosure E includes a door D that is selectively movable to and from: (i) a closed position as shown in FIG. 1 where the door D is located adjacent the body B in covering relation with the access opening O to seal the space S from the environment external to the cabinet and to prevent access to the space S via opening O; and (ii) an opened position as shown in FIG. 2 where the door D is moved to a position wherein it is spaced outwardly away from the body B and away from the access opening O to allow user access to the interior space S via opening O. In the illustrated embodiment, the door is pivotally connected to the body B and pivots between its closed and opened positions, but it can be slidably or otherwise movably connected to the enclosure B or can be completely removable and removed from the body B in the opened position without departing from the overall scope and intent of the present development.

With continuing reference to FIGS. 1 & 2, the rotary latch system 10 selectively captures the door D in its closed position when the latch system 10 is in a first or latched condition or state. The latch system 10 includes a handle H that is selectively rotated by a user to reconfigure the latch system 10 from a latched condition to an unlatched condition or state in which the latch system 10 is disengaged from the door D and allows movement of the door D from its closed position to its opened position.

Figure 3:
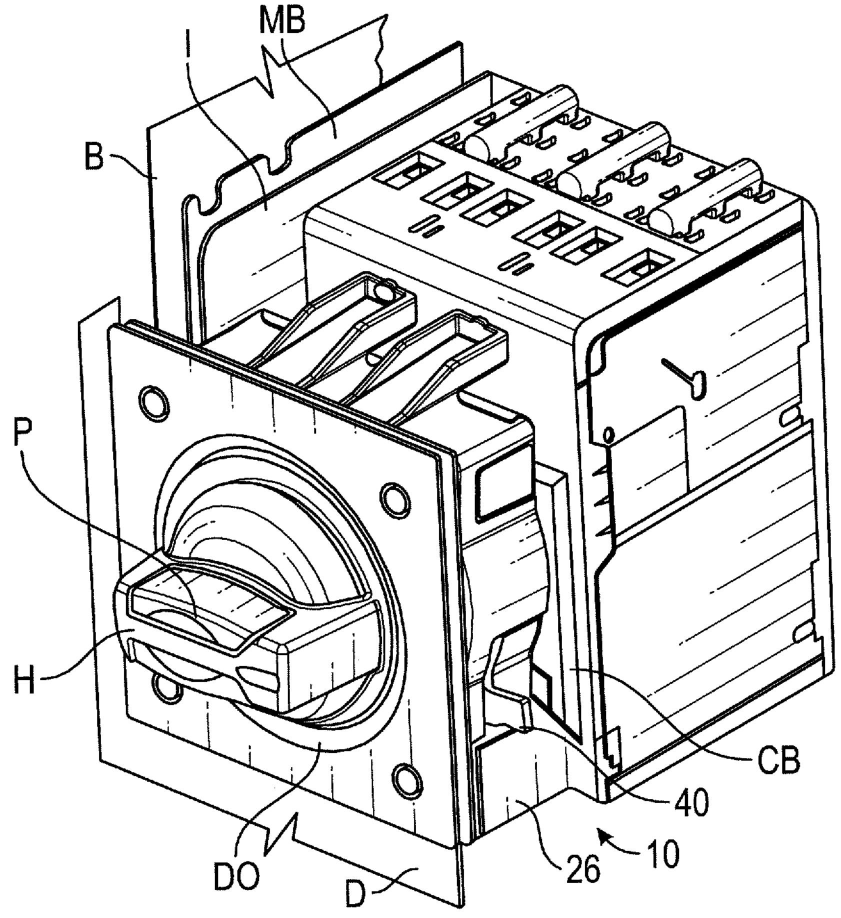
FIG. 3 is an enlarged partial isometric view of the cabinet of FIG. 2 showing the latch system in greater detail.
Figure 4:
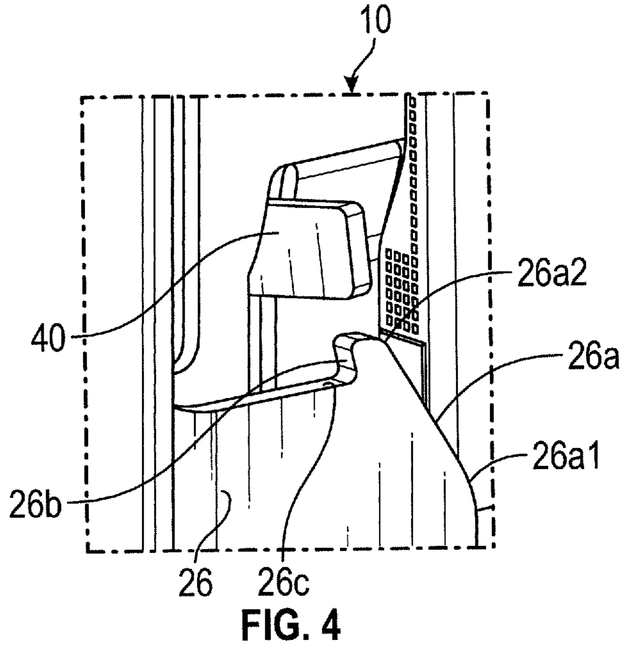
FIG. 4 is an enlarged partial isometric view of the latch system of FIG. 3 showing first and second latch portions thereof in a disengaged state.
Figure 5:
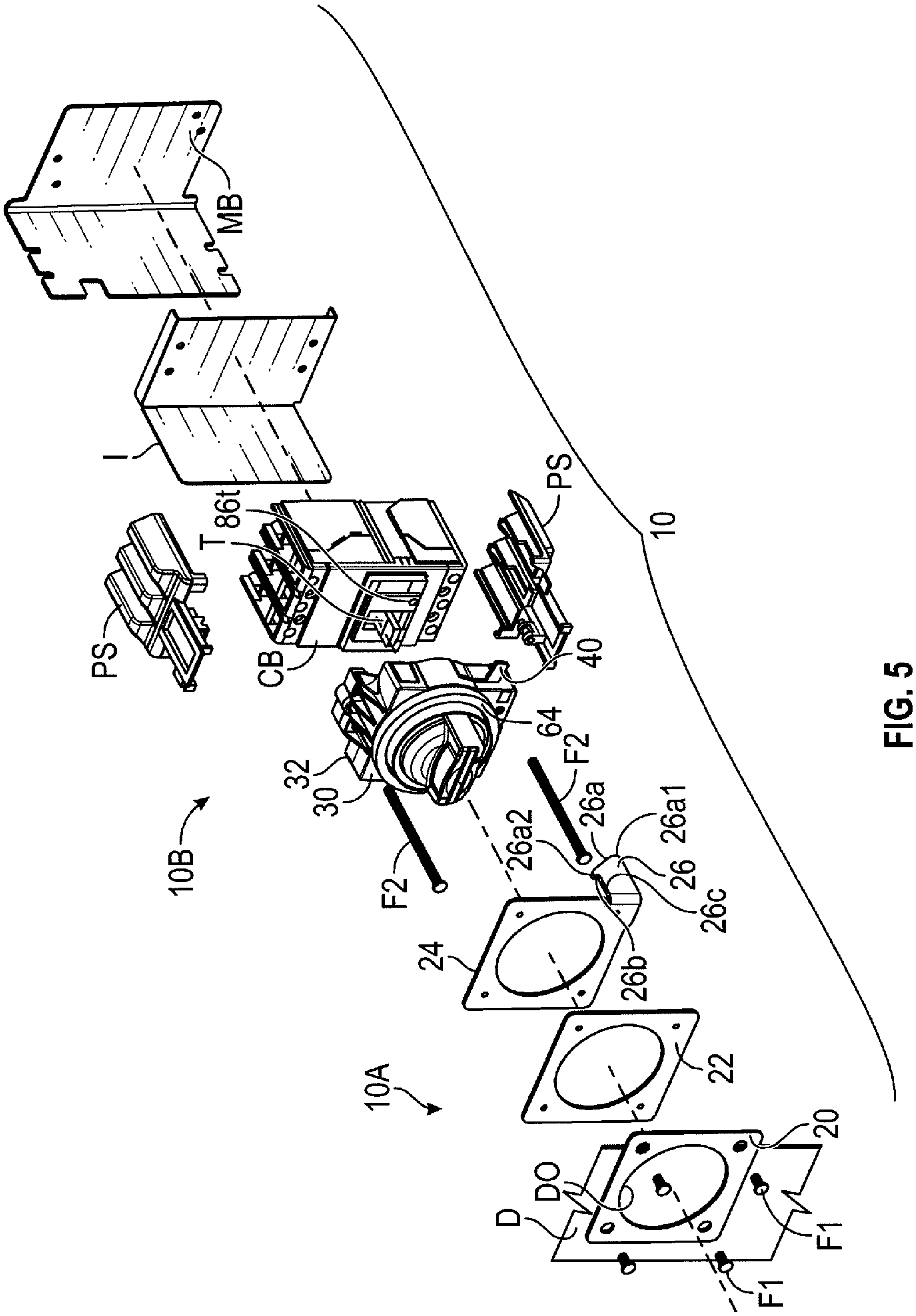
FIG. 5 is an exploded isometric view of the latch system of FIG. 3.

Referring also to FIGS. 3-5, the latch system 10 includes a manually rotatable latch handle H that is manually rotatable by a user about an axis of rotation that is typically but not necessarily a horizontal axis of rotation. The door D includes a latch handle opening DO that allows access to the latch handle H when the door D is in its closed position. As shown herein, the latch handle H projects outwardly through the latch handle door opening DO beyond the door D when the door is closed, but the latch handle H can remain entirely within the space S and be recessed relative to the door opening DO when the door D is closed so that the user can access and rotate the handle H through the opening DO.

With continuing reference to FIGS. 3-5, the latch system 10 is located adjacent and operatively associated with a circuit breaker CB that controls the flow or conduction of electrical power to electrical equipment or electrical components located within the interior space S of the enclosure E. The illustrated circuit breaker CB has four functional positions or states: ON, TRIPPED, OFF, RESET, but other suitable circuit breakers can be used. The ON state is a conductive state as manually set by a user, the TRIPPED state is a non-conductive state resulting from the circuit breaker automatically tripping (becoming non-conductive) due to electrical or other operative conditions, the OFF state is a non-conductive state as manually set by a user to interrupt electrical power, and the RESET state is manually set by a user to reset the contacts of the circuit breaker after the circuit breaker has entered the TRIPPED state. The circuit breaker CB can be provided by any other electrical power conduction control component such as contactor, switch, circuit breaker or the like. As described in more detail below, the latch system 10 is operatively associated with the circuit breaker CB to ensure that: (i) when the door D is latched in its closed position, the door D cannot be moved from its closed position to an opened position when the circuit breaker CB is in its ON (conductive) state unless the latch system 10 is intentionally bypassed by a defeater system as described below; and (ii) when the door D is in an opened position and the circuit breaker handle CB is in its OFF (non-conductive) state, the handle H cannot be operated to set the circuit breaker CB to its ON (conductive) state unless the latch system 10 is intentionally bypassed by a user as described below.

As shown in FIG. 5, the latch system 10 comprises a first group of latch system components 10A that are operatively connected to the door D including an exterior bezel 20 connected adjacent an exterior surface of the door D around the door opening DO, a resilient door seal 22 located adjacent an interior surface of the door D around the door opening DO, and an interior bezel 24 located adjacent the interior surface of the door D around the door opening DO and over the door seal 22. A plurality of fasteners F1 are used to connect the exterior and interior bezels 20,24 together with the door D and door seal 22 sandwiched therebetween. The interior door bezel 24 comprises a latch arm receiver 26 that projects outwardly therefrom. The latch arm receiver 26 comprises an inclined ramp **26*a* that extends from a leading (low) end 26*a*1 to a trailing (high) end 26*a*2. The latch arm receiver 26 further comprises a lock face 26*b* with a first end that transversely intersects the trailing end 26*a*2 of the inclined ramp 26*a* and with an opposite second end that connects to a latch arm recess 26*c***.

Figure 6:
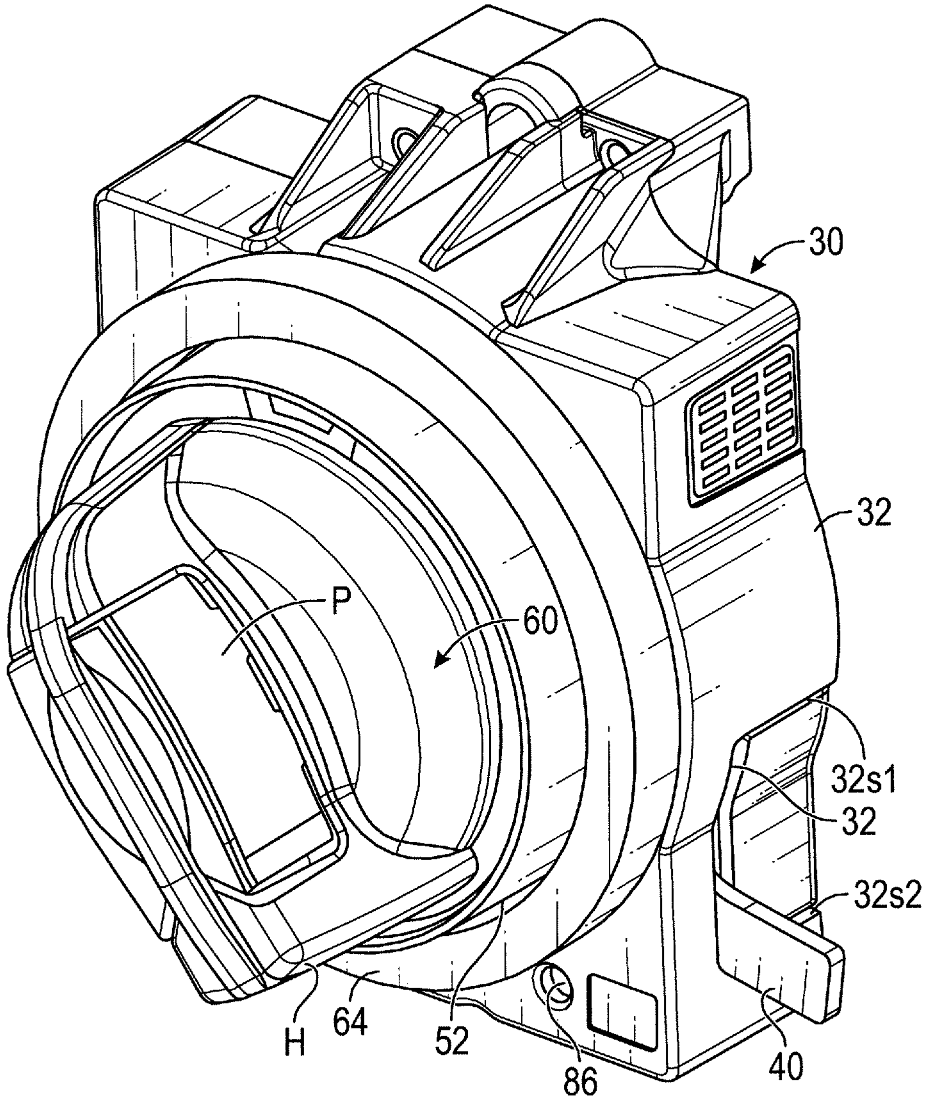
FIG. 6 is an isometric view of the rotary handle latch assembly of the latch system.
Figure 12:
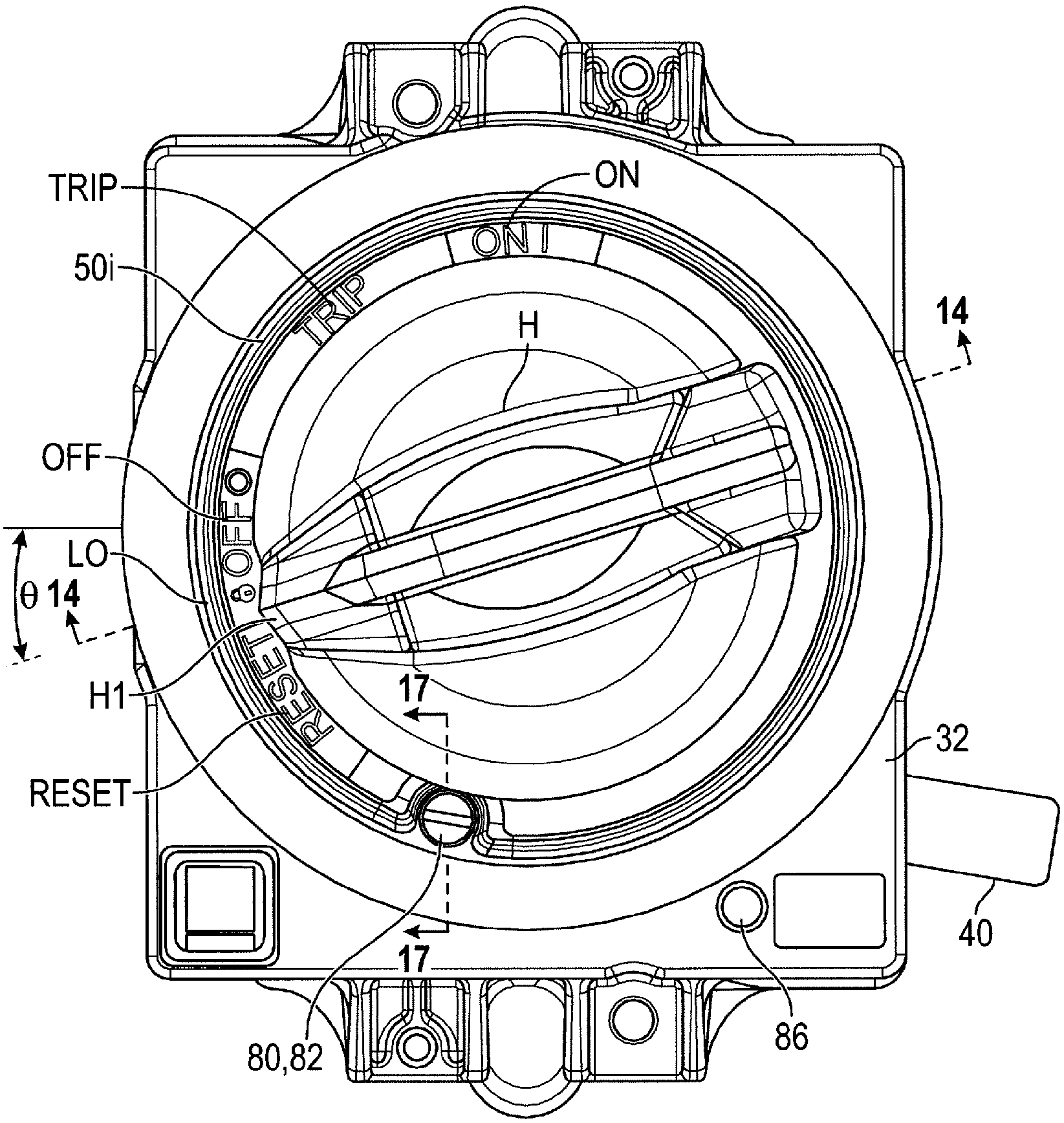
FIG. 12 is a front view of the rotary handle latch assembly with the handle crank subassembly located in a lockout position and a latch arm located in a first (down) position.
Figure 13:
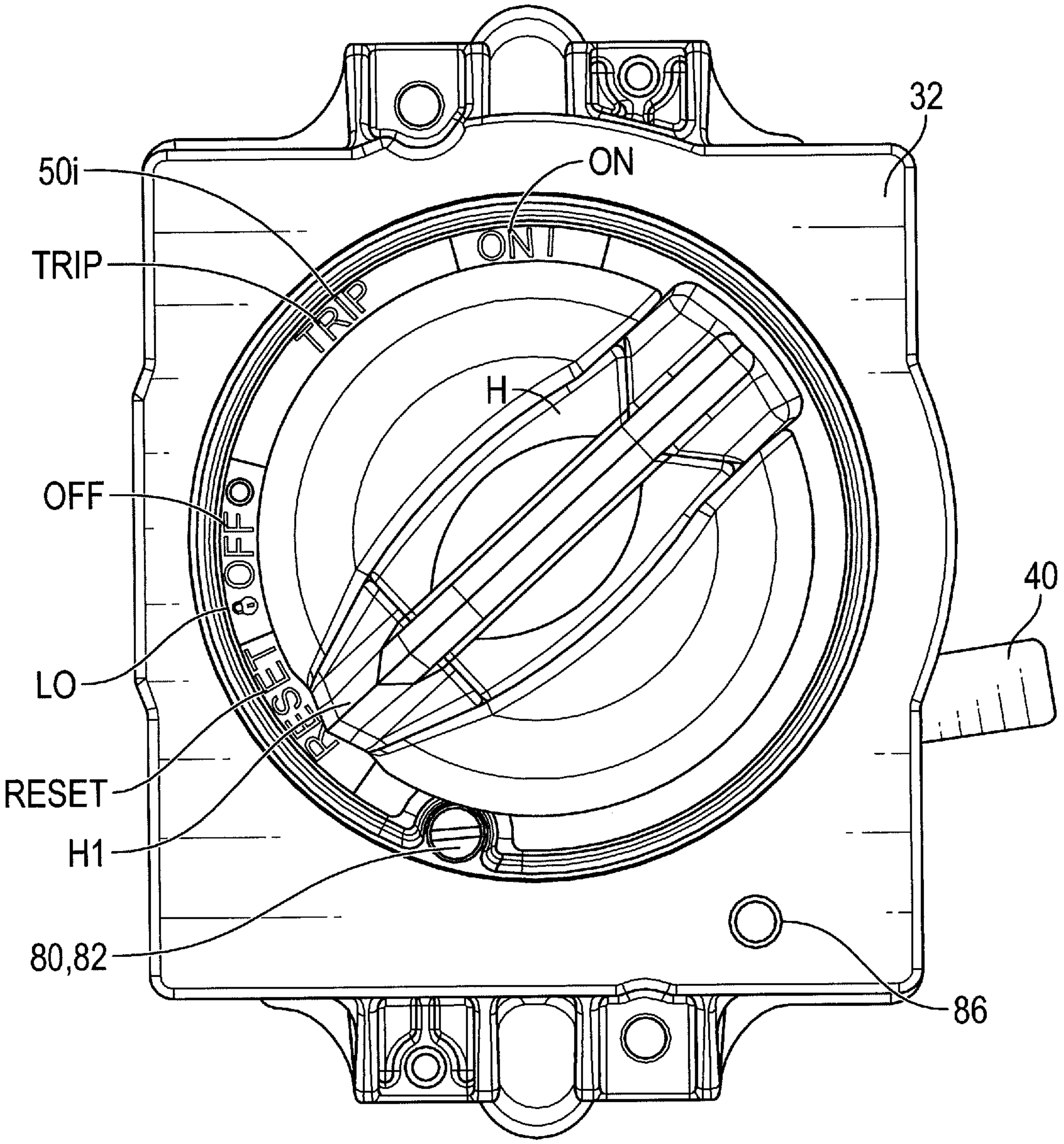
FIG. 13 is a front view of the rotary handle latch assembly of FIG. 12 but shows the handle crank subassembly located in a reset position and the latch arm located in a second operative (unlatched) position.

The latch system 10 further comprises a second group of latch system components 10B (FIG. 5) including a rotary handle latch assembly 30 connected to the enclosure body B inside the space S. The latch assembly 30, shown by itself in FIG. 6, is operatively engaged with the circuit breaker CB. The latch assembly 30 includes a chassis 32 that contains and/or supports the components described below. The latch assembly 30 further comprises a latch arm 40 that projects outwardly therefrom and that moves between a first (down) arm position (shown in FIGS. 6 & 12) and a second (up or unlatched) arm position as shown in FIG. 13. The latch assembly 30 further comprises the rotatable handle H described above by which a user manually controls and changes the position of the latch arm 40 and by which the user manually controls and changes the state of the circuit breaker CB. FIG. 3 shows the latch arm 40 located in an intermediate (latched) arm position between the first (down) and second (up/unlatched) positions where it is engaged with and captured by the latch arm receiver 26 when the door D is located in its closed position such that the latch arm 40 is captured in the latch arm recess 26*c* behind and adjacent the lock face 26*b* whereby engagement between the latch arm 40 and lock face 26*b* prevents movement of the door D from its closed position to its opened position. The latch arm 40 is operatively connected to the handle H of the latch assembly 30 such that when the handle H is rotated fully in a first or counter-clockwise direction to a reset position, the latch arm 40 is moved by the latch assembly 30 from this intermediate position engaged with the latch arm receiver 26 to its second (up) position (FIG. 4) so that the latch arm 40 is lifted out of the latch arm recess 26*c* over the lock face 26*b* so that the latch arm receiver 26 is disengaged from the latch arm 40 to allow the door D to be moved from its closed position to its opened position. As described in more detail below, that the latch assembly 30 includes a spring that continuously spring-biases the latch arm 40 toward and into its first (down) position but that allows the latch arm 40 to be moved from its first (down) position or intermediate position to its second (up/unlatched) position. In this manner, the when the door is in its opened position and the latch arm 40 is in its first (down) position, the door D can be moved to its closed position because the latch arm 40 will contact the inclined ramp 26*a* of the latch arm receiver 26 after which further movement of the door D toward its closed position will cause the latch arm 40 to move up the inclined ramp 26*a* such that the ramp 26*a* moves the latch arm 40 resiliently against the spring-biasing force from its first (down) position toward its second (up) position so that the latch arm 40 moves over the ramp 26*a* and seats in the lock arm recess 26*c* adjacent the lock face 26*b* to once again latch the door D in its closed position.

As shown in FIGS. 3 & 5, the latch assembly 30 can be fixedly and operatively secured to the circuit breaker CB using one or more fasteners F2 that extend through a body of the circuit breaker and that engage a mounting bracket MB that is connected to the body B of the enclosure E inside the space S. An insulator made from any suitable electrically insulative (electrically non-conductive) material can be located between the circuit breaker CB and the mounting bracket and enclosure body B to electrically insulate the circuit breaker CB from the bracket MB and enclosure body B. In one example, the fasteners F2 can be screws that are threaded into mounting bracket MB. As shown in FIG. 5, first and second phase separators PS can be located over opposite ends of the circuit breaker to redirect any plasma blast. The circuit breaker CB includes a toggle T that moves between a first or "on" toggle position, a second or "off" toggle position, a third or "tripped" position, and a fourth or "reset" toggle position corresponding respectively to the ON, OFF, TRIPPED, and RESET operative states of the circuit breaker CB. In the illustrated embodiment, the toggle T pivots about a pivot axis. When the latch assembly 30 is operatively connected to the circuit breaker CB as shown in FIG. 3, the toggle T of the circuit breaker CB is operatively engaged with the latch assembly 30 to be moved by the latch assembly as described in further detail below.

Figure 7:
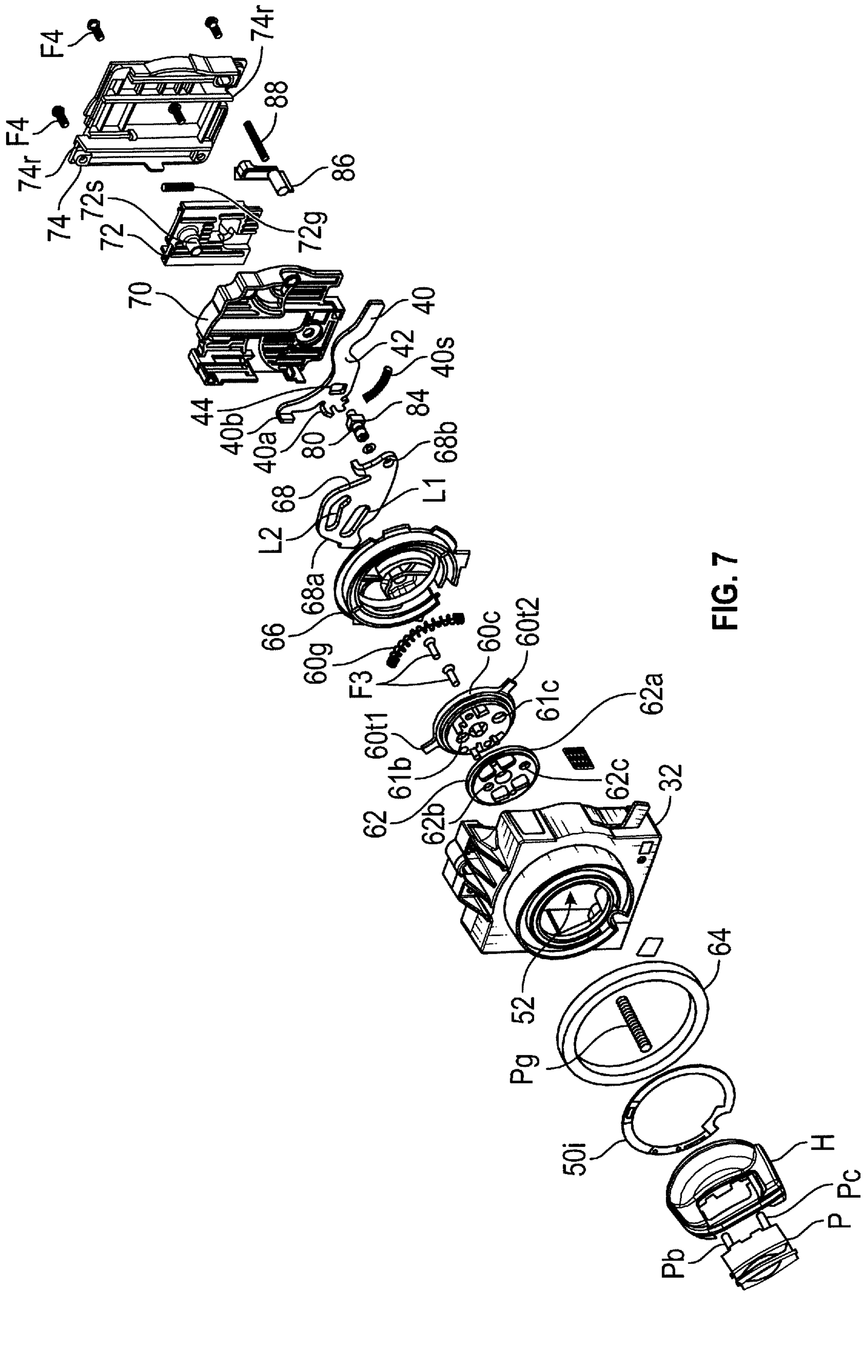
FIG. 7 provides an exploded isometric view of the rotary handle latch assembly of FIG. 6.
Figure 8:
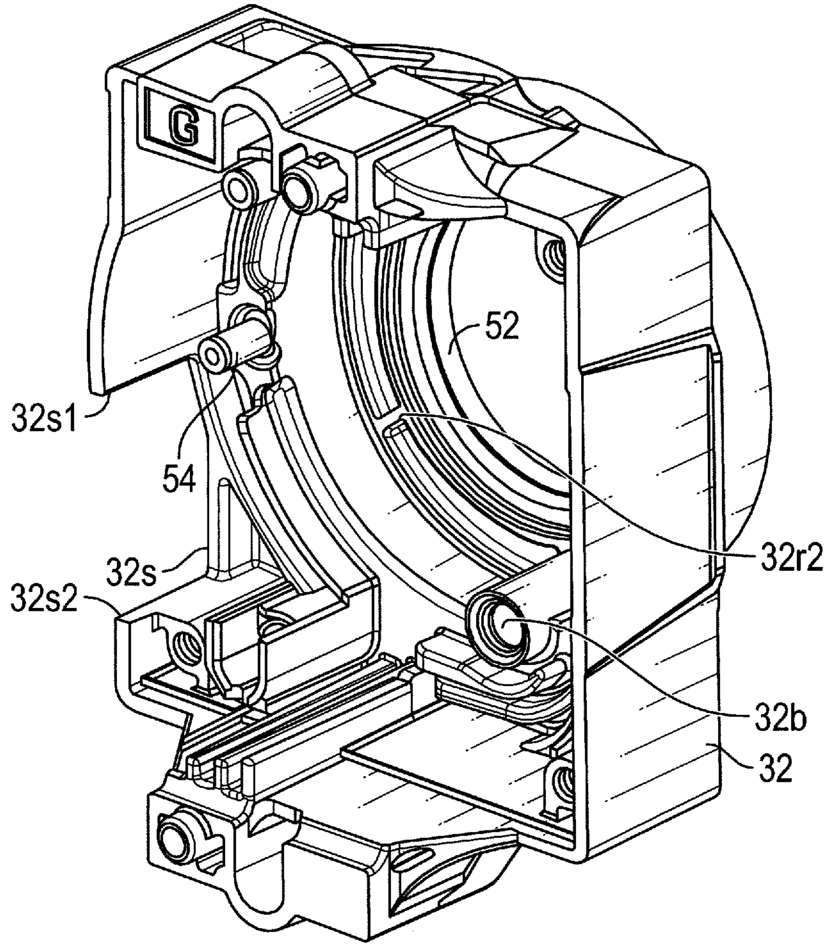
FIG. 8 is a rear isometric view of a chassis of the rotary handle latch assembly.

FIG. 6 shows an isometric view of the latch assembly 30, while FIG. 7 provides an exploded isometric view of the latch assembly 30. The chassis 32 can be defined as a one-piece molded polymeric component. A rear isometric view of the chassis 32 is shown in FIG. 8. The chassis 32 comprises a circular mounting opening 52, and a handle crank subassembly 60 is rotatably mounted in the chassis opening 52. The handle crank subassembly 60 includes the handle H described above, and a lockout plunger P that rotates with the handle and that is slidably connected to the handle H. The handle H projects outwardly from a first or external side of the chassis 32. The handle crank subassembly 60 further includes a crank 60*c* located on a second or rear side of the chassis 32 that is secured to the handle by fasteners F3 or otherwise such that the crank 60*c* and handle H rotate together as a unit. A resilient, elastomeric dynamic seal 62 is located between the handle H and crank 60*c* to provide environmental sealing as described further below. A resilient annular seal 64 such as a foam or other elastomeric seal externally surrounds the chassis opening 52 on the first (external) side of the chassis 32 and sealingly engages the inner door bezel 24 when the door D is in the closed position to inhibit ingress of environmental contaminants into the enclosure space S through the door opening DO (the annular seal 54 can alternatively be secured to the interior door bezel 24 surrounding the door opening DO). The chassis 32 further comprises an indicia ring 50*i* that externally surrounds the chassis opening 52 and handle H and includes visual indicia to provide a user with an indication of the operative position of the handle H and operative state of the circuit breaker CB. As indicated on the indicia ring 50*i*, the handle H comprises four operative positions ON, TRIP, OFF, and RESET that correspond respectively to the ON, TRIPPED, OFF, and RESET states of the circuit breaker CB such that the operative state of the circuit breaker CB and any time will correspond to the position of the handle H as indicated on the indicia ring 50*i*. As described below, the handle H can also be moved to a lockout position LO (that can be indicated by a padlock or other icon on the indicia ring 50*i*) that is adjacent the OFF position of the handle H but is at least 15 degrees angularly offset by an angle theta $\theta$ from the OFF position corresponding to the circuit breaker CB being in its OFF operative state but where the latch assembly 30 can be locked-out for safety as described below.

The latch assembly 30 further comprises a lockout cup 66 non-rotatably connected to the chassis 32 adjacent the crank 60*c* and that is selectively engaged by the lockout plunger P to prevent rotation of the handle H as described below. The lockout cup 66 can be a molded polymeric component. A torque converter 68 is located adjacent the lockout cup and is operatively engaged with the crank 60*c* by a crank stud 60*s* (FIGS. 9 & 11) of the handle crank 60*c*. The latch arm 40 is operatively engaged with the torque converter 68 such that rotational movement of the handle H is transmitted to the latch arm 40 through the crank 60*c*, crank stud 60*s*, and torque converter 68 to move the latch arm 40 between its first (down) and second (up) positions. The torque converter 68 and latch arm 40 can each be provided by one-piece steel components such as steel stampings but can alternatively be cast metal or molded polymeric components. The latch arm 40 includes a body 42 at its inner end comprising first and second transverse tabs 40*a*,40*b* that are selectively engaged with a projecting tooth 68*a* of the torque converter 68. The torque converter 68 includes a pivot aperture 68*b* that is pivotally seated on a pivot stud 54 (FIGS. 8 &18) of the chassis 32. The torque converter 68 also includes a first contoured slot L1 that is slidably engaged by the projecting stud 60*s* (see FIGS. 9-11) of the handle crank 60*c* as described below such that rotation of the handle H and crank 60*c* induces pivoting movement of the torque converter 68 about the pivot stud 54 which, in turn, causes the latch arm 40 to move between its first (down) and second (up) positions in response to rotation of the handle H. A latch arm spring 40*s* is engaged with the latch arm 40 and the chassis 32 and continuously biases the latch arm 40 toward its first (down) position.

Figure 7A:
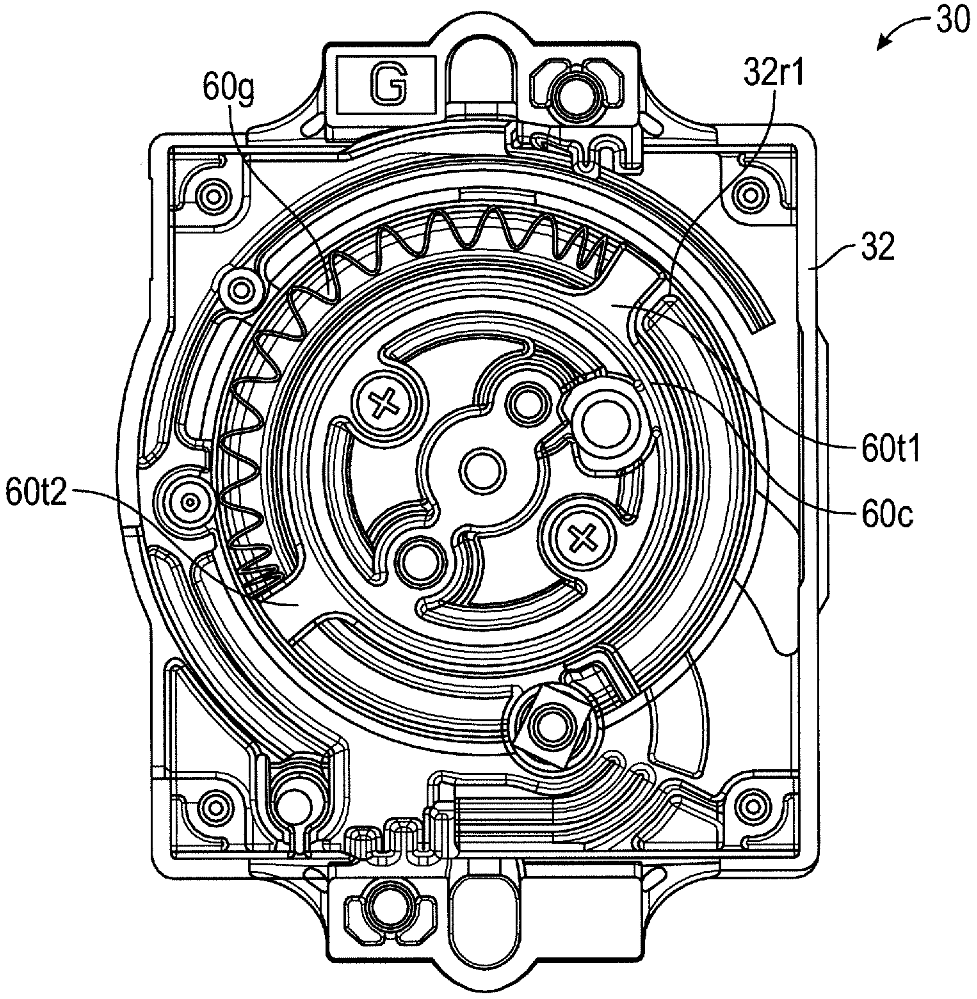
FIG. 7A is a rear view of the latch assembly with portions removed to reveal the placement and operation of the handle position spring.

With reference also to FIGS. 7A & 8, a handle position spring 60*g* is operatively engaged between first and second circumferentially spaced-apart tabs 60*t*1,60*t*2 of the handle crank 60*c*. The spring 60*g* is also positioned between circumferentially spaced-apart ribs 32*r*1,32*r*2 or similar features of the chassis 32 and/or of the lockout cup 66 that is fixed to the chassis 32 such that when the crank 60*c* rotates in a first direction, a first one of the crank tabs 60*t*1 compresses the spring 60*g* in the first direction against a second one of the ribs 32*r*2 and when the crank 60*c* rotates in an opposite second direction, a second one of the crank tabs 60*t*2 compresses the spring 60*g* in the second direction against a first one of the ribs 32*r*1. Thus, the handle position spring is a dual-acting spring that acts between the handle crank 60*c* and the chassis 32 in both first and second directions such that resilient engagement of the spring 60*g* with the chassis 32 exerts a biasing force on the handle crank 60*c* in both the first and second rotational directions depending upon the rotational direction of the handle H such that the handle position spring 60*g* provides a two-way "snap-back functionality whereby: (i) upon partial or incomplete movement of the handle H in the first direction from its ON position toward its OFF position, the spring 60*g* will resilient return the handle H to the ON position when the handle H is released; and (ii) upon partial or incomplete movement of the handle H in the second direction from its OFF position toward its ON position, the spring 60*g* will resilient return the handle H to the OFF position when the handle H is released. This is a safety feature that ensures that the handle H only changes position from ON to OFF and vice versa in response to completed intentional inputs from a user to prevent unintended changes in the conductive state of the circuit breaker CB.

The latch assembly 30 further comprises a slide plate 70 connected to said chassis 30, a rear cover 74 connected to said chassis adjacent the slide plate, and a toggle plate 72 that is located between the slide plate 70 and rear cover 74 that slides in a reciprocal linear manner relative to the chassis 30 between the slide plate 70 and rear cover 74. The rear cover 74 can include a spaced-apart pair of linear rails 74*r* that are slidably engaged by mating recesses 72*r* (see also FIG. 10) of the toggle plate 72 to guide the reciprocal sliding movement of the toggle plate 72. The rear cover 74 can be connected to the chassis 32 by fasteners F4. The toggle plate 72 include a projecting toggle plate stud 72*s* that is slidably located in a second contoured slot L2 of the torque converter 68 (see also FIGS. 9-11) such that pivoting movement of the torque converter 68 in response to rotation of the handle H induces linear movement of the toggle plate 72 between first (down) and second (up) positions. As shown in FIG. 11, the toggle plate 72 includes a recess 73*r* that is engaged with the toggle T of the circuit breaker CB such that linear sliding movement of the toggle plate 72 controls the operative position of the circuit breaker toggle T. A toggle plate spring 72*g* is operatively engaged between the toggle plate 72 and the rear cover 74 and biases the toggle plate 72 and the circuit breaker toggle T engaged therewith toward the OFF position of the circuit breaker toggle T.

Figure 17:
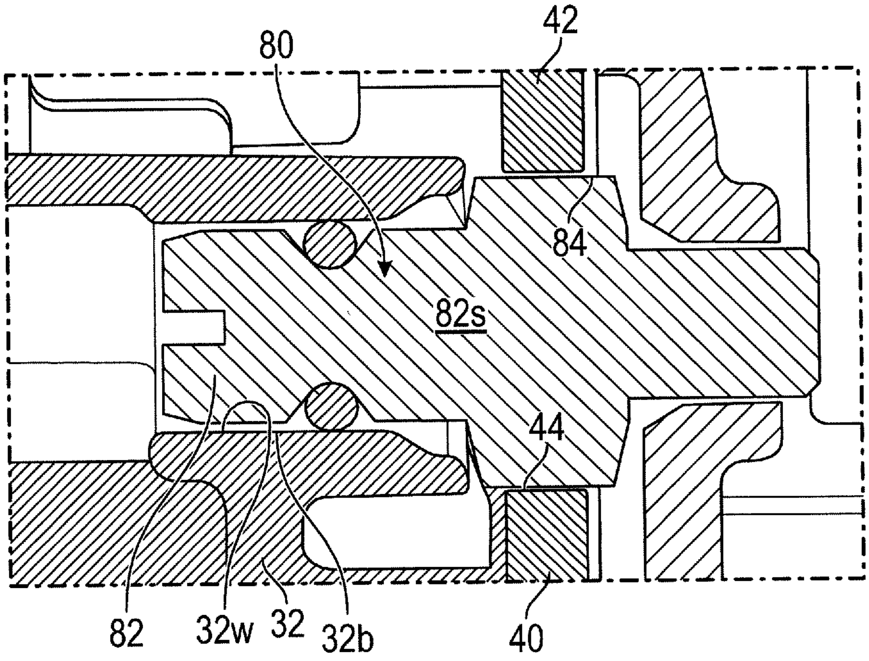
FIG. 17 is a partial section view taken at 17-17 of FIG. 12 and shows a defeater system of the latch assembly including a defeater shaft that is sealingly engaged with the chassis.
Figure 18:
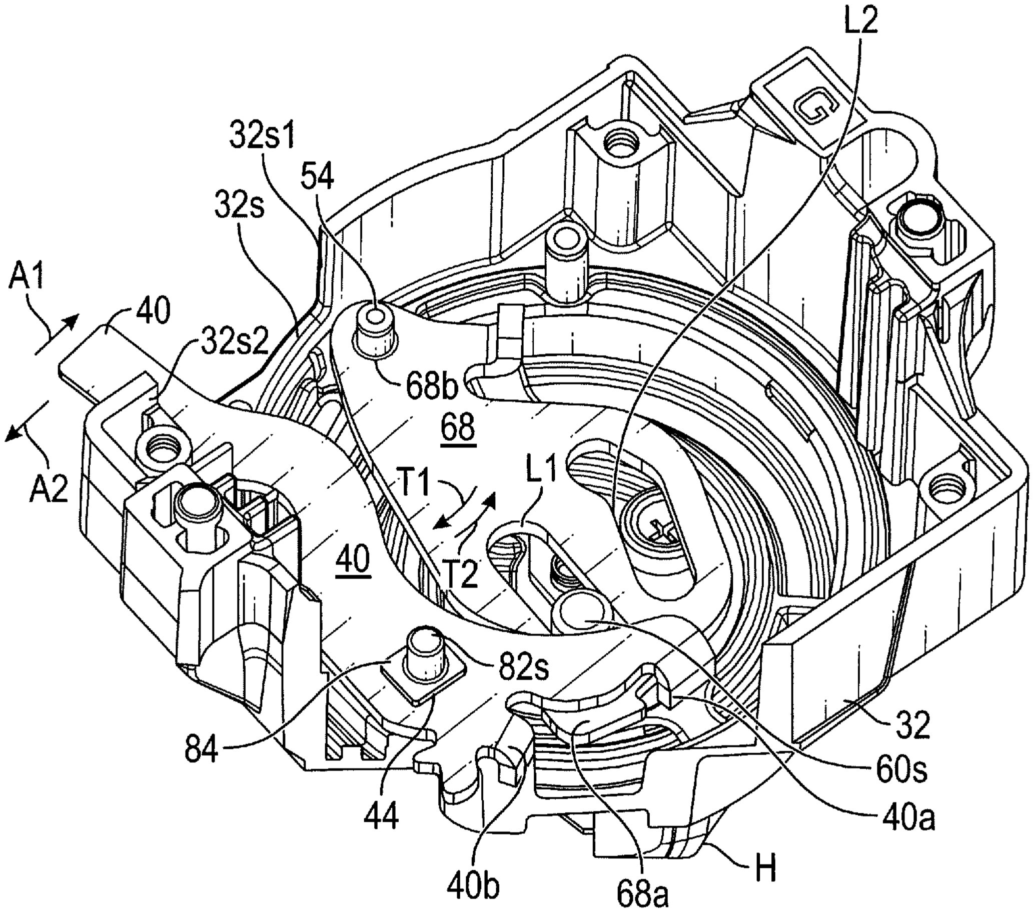
FIG. 18 is a rear isometric view of the latch assembly with parts omitted to reveal the structure and operation of the torque converter and latch arm.

FIG. 7 also shows that the latch assembly 30 comprises a defeater 80 including a defeater shaft 82*s* that pivotally supports the latch arm 40 relative to the chassis 32 such that the latch arm 40 pivots in first and second opposite directions relative to the chassis 32 as limited in each direction by opposite ends 32*s*1,32*s*2 of a slot 32*s* defined by the chassis 32. With reference also to FIGS. 17 & 18, the defeater shaft 82*s* is non-rotatably engaged with the latch arm 40 such that rotation of the defeater 80 in a first direction induces movement of the latch arm 40 from its first (down) position or intermediate (latched) position toward and into its second (up) position to disengage the latch arm 40 from the latch arm receiver 26, even when the circuit breaker CB is in its on (conductive) state as required for certain maintenance and testing procedures. In the illustrated example, the defeater 80 includes a non-circular portion 84 (FIGS. 17 & 18) that is closely located and keyed in a correspondingly non-circular opening 44 of the latch arm body 42 such that the defeater shaft 82*s* pivotally supports the latch arm 40 on the chassis 32 and such that rotation of the defeater causes rotation of the latch arm 40. The defeater shaft 82*s* is rotatably supported on the chassis 32 and comprises a head 82 that is exposed on the first/outer side of the chassis as shown in FIGS. 12 & 13. The defeater head 82 is slotted or otherwise configured to be engaged by a screwdriver or other tool for rotating the defeater to move the latch arm 40 from its first position to its second position to disengage the latch arm 40 from the latch arm receiver 26 to allow the door D to be opened when the circuit breaker CB is in its on/conductive state.

The latch assembly 30 further comprises a test button 86 slidably engaged with the chassis 32. The test button 86 is spring biased to an extended position by a spring 88 engaged with the rear cover 74. As shown in FIGS. 12 & 13, the test button 86 is accessible on the first/outer side of the chassis 32 and can be selectively moved from its normal, extended position to a depressed position in which the test button 86 engages a corresponding test switch or test button 86*t* located on the circuit breaker CB to trip the circuit breaker CB such that it changes from the ON (conductive) state to the TRIPPED state (non-conductive state) and must be reset.

Figure 9:
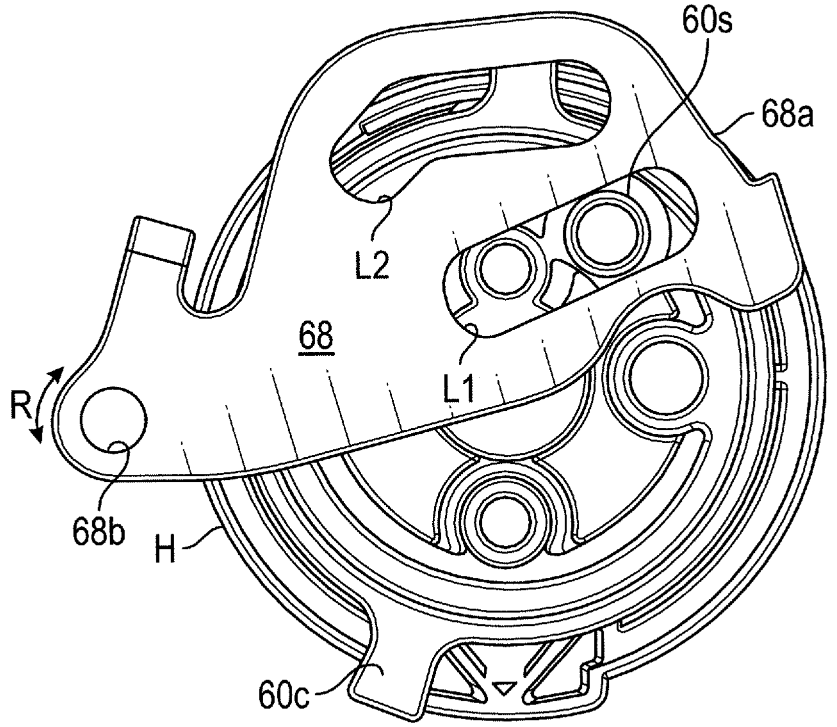
FIG. 9 is a rear view of the rotary handle latch assembly with various components omitted to reveal engagement of a handle crank subassembly with a torque converter.

FIG. 9 shows the operative engagement between the handle crank 60*c* and the torque converter 68. As noted above, the torque converter 68 includes a pivot aperture 68*b* that is pivotally seated on a pivot stud 54 (FIGS. 8 &18) of the chassis 32. The torque converter 68 also includes a first contoured slot L1 that is slidably engaged by a projecting stud 60*s* of the handle crank 60*c* whereby rotation of the handle H and handle crank 60*c* results in sliding movement of the handle crank stud 60*s* in the first contoured slot L1 which induces pivoting movement of the torque converter 68 about the pivot stud 54 as indicated by the arrow R which, in turn, causes the latch arm 40 to move with the torque converter 68 between the first (down) and second (up) positions of the latch arm 40 in response to rotation of the handle H. More particularly, as shown in FIG. 18, rotation of the handle H and handle crank 60*c* in a first direction toward the RESET position causes the torque converter to pivot in a first direction T1 where the projecting tooth 68*a* will contact the second tab 40*b* of the latch arm 40 induce rotation of the latch arm 40 (and defeater shaft 82*s*) in a first direction A1 from the illustrated first (down) position toward and into its second (up) position until the latch arm 40 contacts the first or upper edge 32*s*1 of the chassis slot 32*s*. Rotation of the handle H and crank 60*c* in the opposite direction toward the ON position pivots the torque converter 68 in an opposite, second direction T2 which allows the latch arm spring 40*s* to resiliently pivot the latch arm 40 in a second direction A2 toward its intermediate position. It should be noted, however, that the latch assembly 30 is structured such that when the door D is open and the handle H is in the OFF position, the latch arm 40 is biased by the latch arm spring 40*s* beyond its intermediate (latched)

position (where it engages the latch arm receiver 26) farther away from the second (unlatched) position fully to the first (down) position shown in FIGS. 6 & 12 and also in FIG. 18 where the latch arm 40 abuts the second edge 32*s*2 of the chassis slot 32*s*. When the latch arm 40 is allowed to pivot fully to its first (down) position in contact with the second edge 32*s*2 of the chassis slot 32*s*, the handle H cannot be rotated past the OFF position toward the ON position until the latch arm 40 is lifted out of the first (down) position by either: (i) closing the door D such that the latch arm 40 is lifted by latch arm receiver 26 to its intermediate (latched) position; or (ii) a user manually lifting and holding the latch arm 40 out of the first (down) position. When the latch arm 40 is lifted and held out of the first (down) position, the handle H can then be rotated from the OFF position toward and into the ON position to set the circuit breaker CB in its conductive state. As shown in FIG. 18, this safety feature results from the fact that when the latch arm 40 is in the illustrated first (down) position, the first tab 40*a* of the latch arm 40 will be contacted by the torque converter tooth 68*a* and will block movement of the torque converter 68 in the second direction T2 because the latch arm cannot pivot farther in the second direction A2 due to its engagement with the chassis slot edge 32*s*2. However, when the latch arm 40 is pivoted in the first direction A1, the first tab 40*a* thereof is moved out of the path of the torque converter tooth 68*a* such that the handle H can be rotated fully to the ON position.

Figure 10:
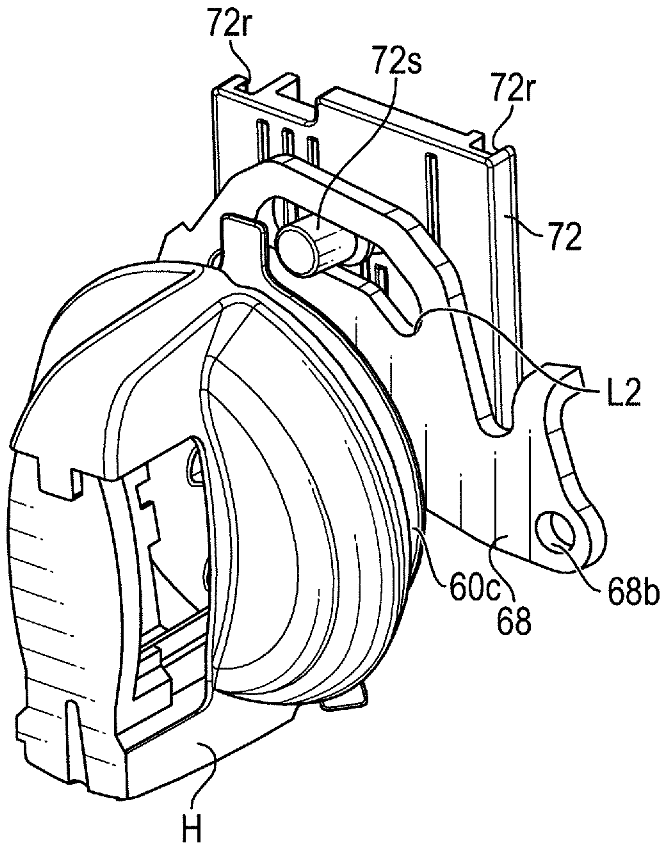
FIG. 10 is a front isometric view of the rotary handle latch assembly with components omitted to show engagement of the handle crank subassembly and torque converter with a toggle plate that moves in a reciprocal linear manner in response to rotational movement of the handle crank subassembly.
Figure 11:
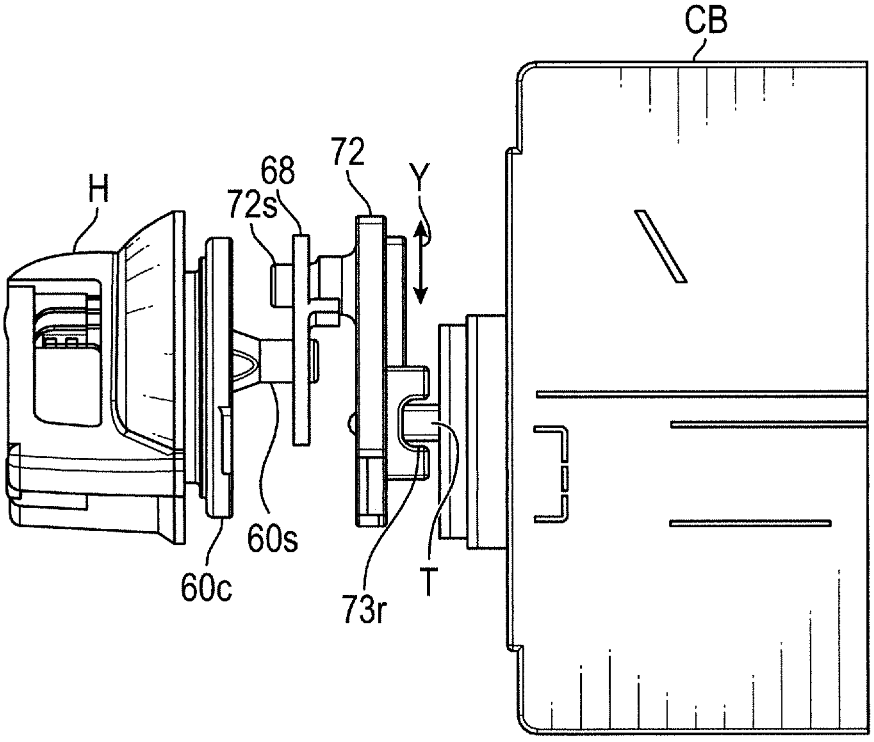
FIG. 11 is a side view of the subassembly of FIG. 10 operatively engaged with an electrical power control device such as a circuit breaker.

FIGS. 10 and 11 show the operative engagement of the toggle plate 72 with the torque converter 68. The toggle plate 72 include a projecting stud 72*s* that is slidably located in a second contoured slot L2 of the torque converter 68 such that pivoting movement of the torque converter 68 in response to rotation of the handle H induces sliding movement of the toggle plate stud 72*s* in the second contoured slot L2 which causes linear movement of the toggle plate 72 between first (down) and second (up) positions as indicated by the arrow Y. As shown in FIG. 11, the toggle plate 72 includes a recess 73*r* that is engaged with the toggle T of the circuit breaker CB such that linear sliding movement of the toggle plate 72 controls the operative position of the circuit breaker toggle T and thus controls the operative state of the circuit breaker CB.

With reference to FIGS. 12 & 13, the indicia ring 50*i* indicates five different locations for the handle H: ON, TRIP, OFF, LOCKOUT (indicated by a padlock or other icon LO), and RESET. The handle H can be rotated to an ON handle position where its nose H1 is aligned with the ON location on the indicia ring 50*i* which places the latch arm 40 in the first (down) position (or intermediate (latched) position) and sets the circuit break CB to its on/conductive state. The handle H can be rotated such that its nose H1 is aligned with the OFF handle position on the indicia ring 50*i* which places the circuit breaker CB in its off/non-conductive state but leaves the latch arm 40 in the first (down) position or intermediate (latched) position. If the circuit breaker CB is tripped from its on/conductive state, movement of the toggle T will cause the handle H to rotate such that its nose H1 is aligned with the TRIP handle location of the indicia ring 50*i* to provide a visual indication to the user that the circuit breaker CB has been tripped. To reset the circuit breaker CB and to move the latch arm 40 from its first position or its intermediate position (FIG. 3 or FIG. 12) to the second/up position (FIG. 13) to allow the door D to be opened, the handle H must be rotated such that its nose H1 is aligned with the RESET handle position on the indicia ring 50*i* as shown in FIG. 13.

FIG. 12 shows the handle H positioned in a LOCKOUT handle position with its nose H1 aligned with lockout indicia (such as the padlock icon LO) of the indicia ring 50*i*. As noted, the lockout plunger P rotates together with the handle H but is axially slidable relative to the handle H between its extended/disengaged position and its depressed/engaged position. When the handle H is located in the LOCKOUT handle position LO or when the handle H is located in any position between and including the lockout position LO and RESET position, the lockout plunger P can be depressed and locked in the depressed state or engaged state to activate a lockout function of the handle H which prevents movement of the handle H toward the ON position from the LOCKOUT handle position. Engagement of the lockout plunger P thus ensures that the circuit breaker CB cannot be placed in a conductive ON state when the handle H is located in the LOCKOUT handle position with the lockout plunger P engaged.

Figure 14:
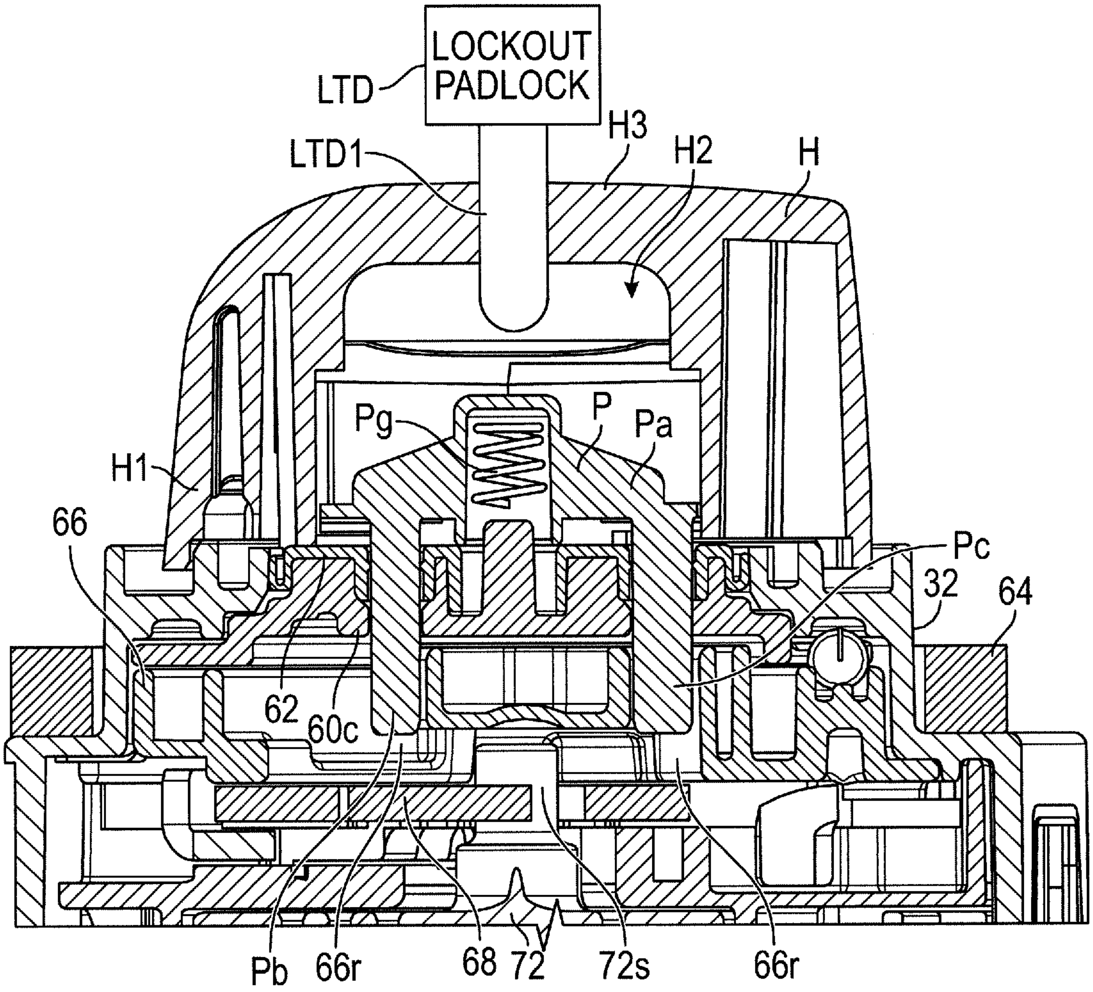
FIG. 14 is a partial section view of the rotary handle latch assembly as taken at 14-14 of FIG. 12 and shows the lockout plunger moved to its depressed/engaged position.
Figure 15:
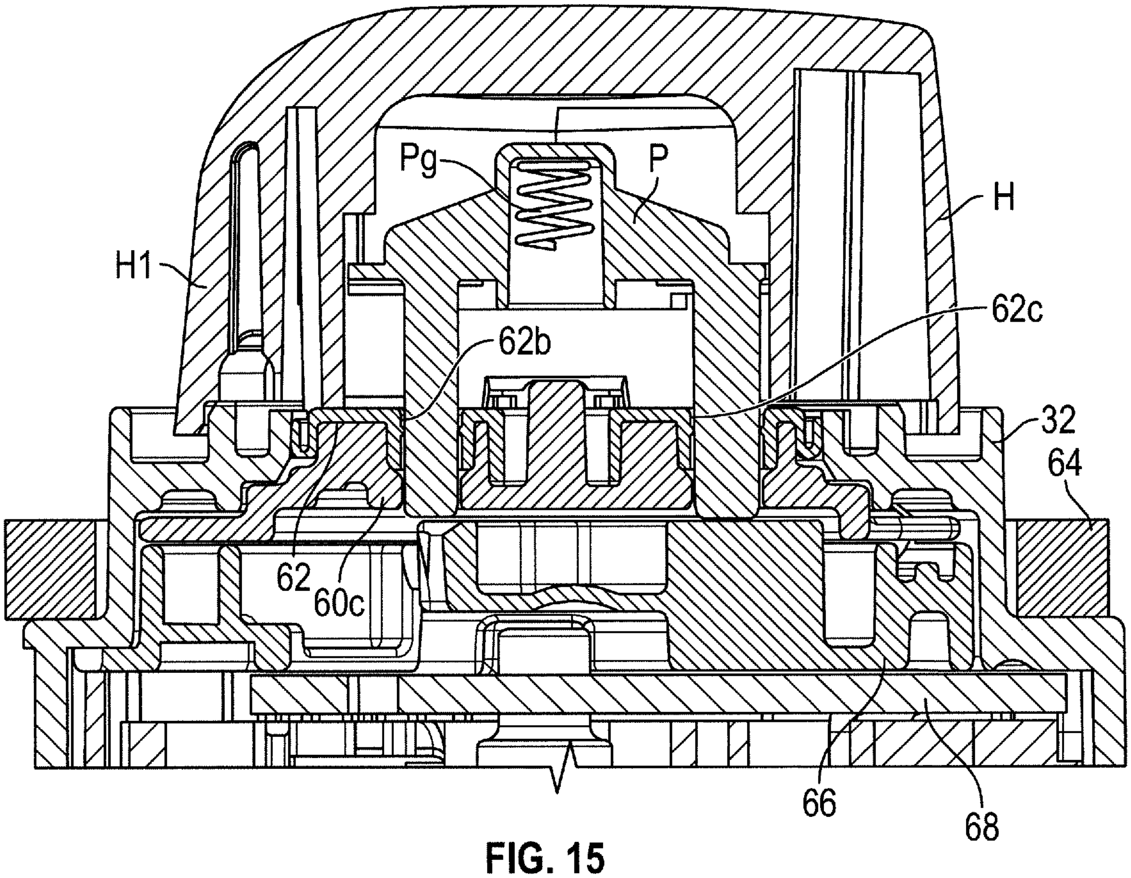
FIG. 15 is a partial section view that is similar to FIG. 14 but shows the handle crank subassembly in the OFF position where the lockout plunger is mechanically blocked by the from being moved from the illustrated extended/disengaged position to the depressed/engaged position of FIG. 14.

According to one aspect of the present development, the LOCKOUT handle position illustrated in FIG. 12, where the handle nose H1 is aligned with the lockout icon LO, is adjacent but angularly separated the OFF position, where the handle H is ordinarily positioned to manually place the circuit breaker CB in its non-conductive OFF state. In particular, the handle H1 must be rotated in the first, counter-clockwise direction away from the ON position by a safety angle theta θ of at least an additional 15 degrees beyond the indicated OFF position to be in the LOCKOUT handle position where the handle nose H1 is aligned with the locket indicia LO and the plunger P can be depressed/engaged. FIG. 14 is a section view taken at 14-14 of FIG. 12, wherein the handle H is in the LOCKOUT handle position and the lockout plunger P is depressed into an engaged position. FIG. 15 is a section view that is similar to FIG. 14 but shows the handle H in the OFF position and shows the lockout plunger P in its extended, disengaged position. The lockout plunger P comprises a body Pa and at least one but preferably at least first and second legs Pb,Pc that extend axially outward from the body Pa toward the lockout cup 66. A lockout plunger return spring Pg is located between the plunger body Pa and the handle crank 60*c* and biases the lockout plunger P outwardly toward its extended, disengaged position (FIG. 15). When the handle H is in the lockout position LO, which is distinct from the OFF position as noted above, the lockout plunger P can be manually moved/depressed into its engaged position as shown in FIG. 14, where the first and second legs Pb,Pc extend through the handle H, through respective first and second apertures 61*b*,61*c* defined through the handle crank 60*c*, and are moved axially into respective first and second lockout recesses 66*r* in the lockout cup 66. When the first and second legs Pb,Pc are located in the respective first and second lockout recesses 66*r*, the handle H can be rotated only in a first (counter-clockwise) direction away from the ON position toward and into the RESET position to reset the circuit breaker CB, but the handle H cannot be rotated in the opposite second (clockwise) direction, from the lockout position toward or to the ON position such that the circuit breaker CB cannot be set to its ON or conductive state when the lockout plunger P is located in its depressed, engaged position. When the handle H is located in the OFF handle position, the TRIP handle position, or the ON handle position, the lockout recesses 66*r* are not respectively registered or aligned with the first and second plunger legs Pb,Pc which prevent movement of the plunger to its depressed/engaged position.

When the lockout plunger P is depressed/engaged, an enclosed handle lockout space H2 (FIG. 14) is opened between the lockout plunger P and an outer, grasping portion H3 of the handle H. When the handle lockout space H2 is opened by depressing/engaging the lockout plunger P, a lockout padlock and/or tagout card and/or any other selectively applied lockout or tagout device LTD can be connected to the handle H such that a shackle LTD1 portion of the lockout device extends through and is captured in the handle lockout space H2 and blocks movement of the lockout plunger P from its depressed, engaged position to its extended, disengaged position. When the lockout padlock or other lockout device LTD is removed from the lockout space H2 of the handle H, the lockout return spring Pg urges the plunger P back to its extended, disengaged position to allow rotation of the handle H in both the first and second directions.

Figure 16:
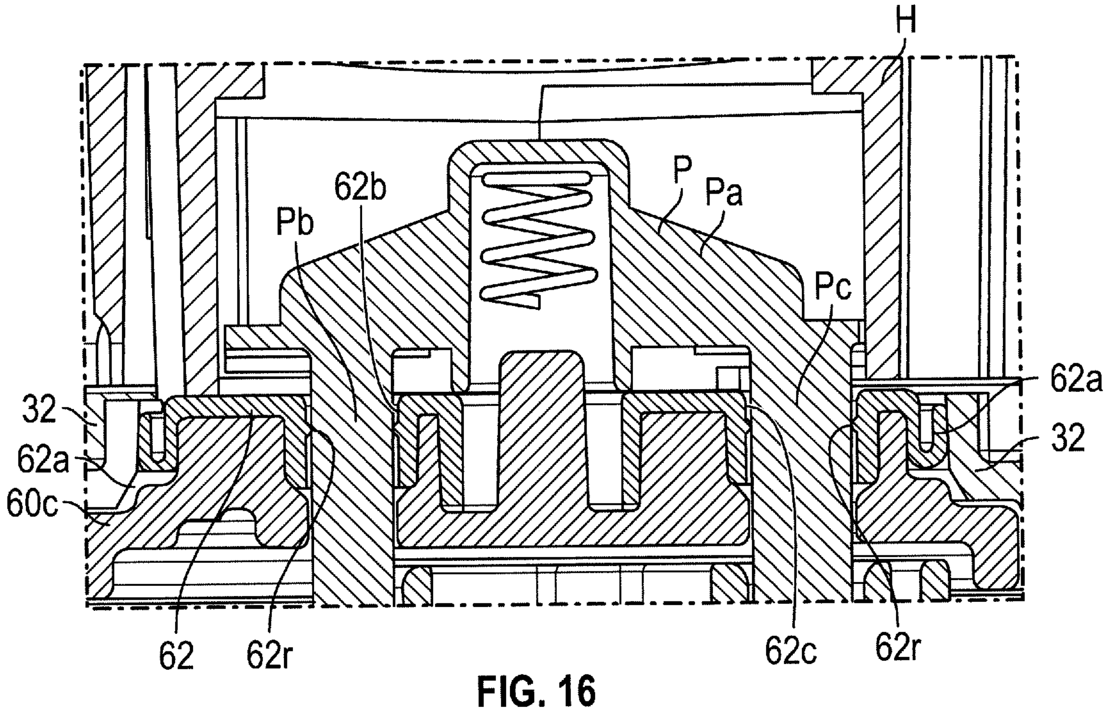
FIG. 16 is a greatly enlarged portion of FIG. 15 that illustrates a dynamic seal that sealingly engages the chassis, the handle crank subassembly, and the lockout plunger.

The latch assembly 30 is sealed to at least inhibit ingress of environmental contaminants. Likewise, the interface between the latch arm assembly 30 and the door D of the enclosure E is also sealed to at least inhibit ingress of environmental contaminants. In one, non-limiting example, the sealing in both instances at least satisfies IP54 sealing standards. As noted above, a resilient, elastomeric dynamic seal 62 is located between the handle H and crank 60*c* to provide environmental sealing for the latch arm assembly 30, and a resilient annular seal 64 is connected to the latch assembly 30 or to the interior door bezel 24 to seal the interface between the inner door bezel 24 and the latch assembly chassis 32. As shown in the partial, enlarged section view of FIG. 16, the dynamic seal 62 is closely fitted to the handle crank 60*c* and comprises an annular peripheral sealing lip 62*a* that sealingly engages the chassis 32 to provide an environmental seal between the handle crank 60*c* and the chassis 32 where the handle crank 60*c* rotates relative to the chassis 32. The dynamic seal 62 further comprises first and second seal apertures 62*b*,62*c* through which the first and second plunger legs Pb,Pc of the lockout plunger P slidably extend. The dynamic seal 62 comprises first and second continuous, circumferentially extending sealing ribs 62*r* that project radially inward from the cylindrical wall defining each of the first and second seal apertures 62*b*,62*c* and that sealingly engage the respective plunger legs Pb,Pc to inhibit flow of environmental contaminants into the handle crank subassembly 60 where the lockout plunger legs Pb,Pc extend through the handle crank 60*c*.

FIG. 17 provides a section view through the defeater mechanism 80 of the latch arm assembly 30 and shows that a defeater shaft 80*s* is rotatably located in a defeater shaft bore 32*b* of the chassis 32. The defeater shaft 82*s* comprises an O-ring seal coaxially positioned thereon that is sealingly engaged with the cylindrical wall 32*w* of the chassis 32 that defines the defeater bore 32*b* to inhibit ingress of environmental contaminants into the handle crank subassembly 60 through the defeater shaft bore 32*b* between the defeater shaft 82*s* and the cylindrical wall 32*w* of the defeater bore 32*b*.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A latch system for an electrical equipment enclosure, said latch system comprising:

a latch arm receiver adapted to be connected to an associated enclosure door; and a latch arm assembly adapted to be connected in operative engagement with an associated circuit breaker, said latch arm assembly comprising:

a chassis;

a latch arm that moves relative to the chassis between: (i) a first arm position; (ii) a second arm position; and (iii) an intermediate arm position between the first arm position and the second arm position;

a latch arm spring that biases the latch arm toward its first arm position;

a handle rotatably connected to the chassis and operatively connected to a toggle of the associated circuit breaker, said handle movable to and between an ON handle position, a TRIP handle position, an OFF handle position, and a RESET handle position;

said handle operatively connected to said latch arm such that said latch arm is positioned in said second arm position when said handle is located in said RESET handle position, wherein said latch arm spring biases said latch arm into one of said first arm position and said intermediate arm position when said handle is in any one of said ON handle position, said TRIP handle position, and said OFF handle position; and a lockout plunger connected to the handle to rotate with the handle and movable between a disengaged position and an engaged position, wherein said lockout plunger prevents movement of the handle from the OFF handle position to the ON handle position when the lockout plunger is in its engaged position.

2. The latch system as set forth in claim 1, wherein said lockout plunger is movable from its disengaged position to its engaged position only when said handle is rotated away from said OFF handle position toward said RESET handle position to a LOCKOUT handle position.

3. The latch system as set forth in claim 2, wherein said LOCKOUT handle position is at least 15 degrees angularly spaced from said OFF handle position toward said RESET handle position.

4. The latch system as set forth in claim 3, wherein said latch arm assembly comprises a lockout cup connected to said chassis, and wherein said lockout plunger comprises at least one leg that engages said lockout cup when said lockout plunger is located in its engaged position such that said lockout cup prevents rotation of the lockout plunger and handle from the OFF handle position toward the ON handle position.

5. The latch system as set forth in claim 4, wherein said at least one leg of the plunger comprises first and second plunger legs that are received into respective first and second lockout recesses of the lockout cup with the lockout plunger is located in its engaged position.

6. The latch system as set forth in claim 5, wherein said first and second lockout recesses of the lockout cup are aligned with said first and second plunger legs when said handle is rotated to the LOCKOUT handle position and wherein said first and second lockout recesses are unaligned respectively with the first and second plunger legs when said handle is located in the OFF handle position, the TRIP handle position, and the ON handle position.

7. The latch system as set forth in claim 1, wherein a handle lockout space is defined between the lockout plunger and a portion of the handle when the lockout plunger is located in its engaged position, said handle lockout space adapted to receive a lockout device that blocks movement of the lockout plunger from its engaged position to its disengaged position.

8. The latch system as set forth in claim 7, further comprising a lockout return spring operatively engaged with the lockout plunger that biases the lockout plunger toward its disengaged position.

9. The latch system as set forth in claim 1, wherein said latch arm assembly further comprises:

a torque converter pivotally connected to the chassis and comprising a first contoured slot; and a handle crank connected to said handle to define a handle crank subassembly, said handle crank comprising a crank stud that projects outwardly therefrom and that is slidably located in said first contoured slot of said torque converter such that rotation of said handle crank subassembly in a first handle rotation direction induces pivoting movement of the torque converter in a first torque converter pivot direction, wherein said torque converter selectively engages said latch arm and pivots said latch arm toward said second arm position.

10. The latch system as set forth in claim 9, wherein said latch arm blocks pivoting movement of said torque converter in a second torque converter pivot direction opposite the first torque converter pivot direction in response to movement of the handle in a second handle rotation direction when said latch arm is located in its first arm position.

11. The latch system as set forth in claim 10, wherein:

said latch arm comprises first and second tabs;

said torque converter comprises a projecting tooth;

said first tab of said latch arm blocks movement of the projecting tooth of the torque converter in said second torque converter pivot direction when said latch arm is located in said first arm position and allows movement of the projecting tooth of the torque converter in said second torque converter pivot direction when said latch arm is in its intermediate arm position or in its second arm position; and said projecting tooth of said torque converter contact said second tab of said latch arm and pivots said latch arm toward said second arm position when said torque converter pivots in said first torque converter pivot direction.

12. The latch system as set forth in claim 9, wherein:

said torque converter comprises a second contoured slot;

said latch arm assembly further comprises a toggle plate that slides in a reciprocal linear manner relative to said chassis, said toggle plate comprising a projecting toggle plate stud that is slidably located in said second contoured slot of said torque converter such that pivoting movement of the torque converter induces reciprocal sliding linear motion of the toggle plate; and said toggle plate adapted to be operatively engaged with an associated toggle of the associated circuit breaker.

13. The latch system as set forth in claim 9, wherein said handle crank comprising first and second circumferentially spaced-apart tabs and said chassis comprises first and second circumferentially spaced-apart ribs, said latch arm assembly further comprising a handle position spring positioned between the first and second tabs and between the first and second ribs such that: (i) rotation of the handle crank in a first rotational direction compresses said handle position spring between said second rib and said first tab such that said spring biases said handle crank in a second rotational direction opposite the first rotational direction; and (ii) rotation of the handle crank in the second rotational direction compresses said handle position spring between said first rib and said second tab such that said spring biases said handle crank in the first rotational direction.

14. The latch system as set forth in claim 13, wherein said handle position spring resiliently returns said handle to the ON handle position if said handle is manually moved only partially toward said OFF handle position, and said handle position spring resiliently returns said handle to the OFF handle position if said handle is manually moved only partially toward said ON handle position.

15. The latch system as set forth in claim 9, wherein said chassis comprises a circular mounting opening in which said handle crank subassembly is rotationally supported, said latch arm assembly further comprising a dynamic seal connected to said handle crank, said dynamic seal comprising:

a peripheral sealing lip sealingly engaged with said mounting opening; and a seal aperture through which a portion of said lockout plunger extends, wherein said dynamic seal comprises a sealing rib located in said seal aperture and sealingly engaged with said portion of said lockout plunger.

16. The latch system as set forth in claim 1, further comprising a defeater comprising a defeater shaft rotatably connected to said chassis and non-rotatably connected to said latch arm such that said defeater shaft rotationally supports said latch arm for pivoting movement between said first arm position, said second arm position, and said intermediate arm position, said defeater shaft comprising a head adapted to be engaged and rotated by a tool to rotate said defeater shaft and said latch arm toward said second arm position.

17. The latch system as set forth in claim 16, wherein said chassis comprises a defeater shaft bore and said latch arm assembly comprises a seal coaxially positioned on said defeater shaft and engaged with a cylindrical wall of said chassis that defines said defeater shaft bore.

18. The latch system as set forth in claim 15, further comprising an annular door seal connected to said chassis and surrounding said mounting opening, said door opening seal adapted to engage the associated enclosure door.

19. An enclosure comprising:

a body including an internal space and an enclosure opening that provides access to the internal space;

a door movable between a closed position and an opened position, wherein the door covers the enclosure opening and blocks access to the internal space in the closed position, said door including a door opening defined therein; and a latch system connected to said body in said internal space, said latch system comprising:

a latch arm receiver connected to said door;

a circuit breaker that controls connection of electrical power to associated equipment located in said internal space of said body, said circuit breaker including a toggle that moves between a first toggle position, a second toggle position, a third toggle position, and a fourth toggle position corresponding respectively to ON, TRIPPED, OFF, and RESET operative states of the circuit breaker; and a latch arm assembly connected to the circuit breaker in operative engagement with the circuit breaker toggle to move said toggle between said first, second, third, and fourth toggle positions, said latch arm assembly comprising:

a chassis;

a latch arm that moves relative to the chassis between: (i) a first arm position; (ii) a second arm position; and (iii)

an intermediate arm position between the first arm position and the second arm position; wherein said latch arm is located in said intermediate arm position when engaged with the latch arm receiver;

a latch arm spring that biases the latch arm toward its first arm position;

a handle rotatably connected to the chassis and operatively connected to the toggle of the circuit breaker, said handle movable to and between an ON handle position corresponding to the first toggle position, a TRIP handle position corresponding to the second toggle position, an OFF handle position corresponding to the third toggle position, and a RESET handle position corresponding to the fourth toggle position;

said handle operatively connected to said latch arm such that said latch arm is positioned in said second arm position when said handle is located in said RESET handle position, wherein said latch arm spring biases said latch arm into one of said first arm position and said intermediate arm position when said handle is in any one of said ON handle position, said TRIP handle position, and said OFF handle position; and a lockout plunger connected to the handle to rotate with the handle and movable between a disengaged position and an engaged position, wherein said lockout plunger prevents movement of the handle from the OFF handle position to the ON handle position when the lockout plunger is in its engaged position.

20. A latch system for an electrical equipment enclosure, said latch system comprising:

a latch arm receiver adapted to be connected to an associated enclosure door; and a latch arm assembly adapted to be connected in operative engagement with an associated circuit breaker, said latch arm assembly comprising:

a chassis;

a latch arm that moves relative to the chassis between: (i) a first arm position; (ii) a second arm position; and (iii) an intermediate arm position between the first arm position and the second arm position;

a latch arm spring that biases the latch arm toward its first arm position;

a handle rotatably connected to the chassis and operatively connected to a toggle of the associated circuit breaker, said handle movable to and between an ON handle position, a TRIP handle position, an OFF handle position, and a RESET handle position;

said handle operatively connected to said latch arm such that said latch arm is positioned in said second arm position when said handle is located in said RESET handle position, wherein said latch arm spring biases said latch arm into one of said first arm position and said intermediate arm position when said handle is in any one of said ON handle position, said TRIP handle position, and said OFF handle position;

a lockout plunger connected to the handle to rotate with the handle and movable between a disengaged position and an engaged position, wherein said lockout plunger prevents movement of the handle from the OFF handle position to the ON handle position when the lockout plunger is in its engaged position; and said lockout plunger movable from its disengaged position to its engaged position only when said handle is rotated away from said OFF handle position toward said RESET handle position to a LOCKOUT handle position that is at least 15 degrees angularly spaced from said OFF handle position toward said RESET handle position.

* * * * *